United States Patent
Teshima (10) Patent No.: US 7,103,368 B2
(45) Date of Patent: Sep. 5, 2006

(54) APPARATUS AND METHOD FOR DELIVERY OF ADVERTISEMENT INFORMATION TO MOBILE UNITS

(75) Inventor: Toru Teshima, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 684 days.

(21) Appl. No.: 09/812,952

(22) Filed: Mar. 27, 2001

(65) Prior Publication Data

US 2002/0032035 A1    Mar. 14, 2002

(30) Foreign Application Priority Data

May 23, 2000    (JP) .............................. 2000-151600

(51) Int. Cl.
*H04Q 7/20* (2006.01)
(52) U.S. Cl. ............................. 455/456.3; 455/414.1; 455/414.2; 455/412.2; 455/456.1
(58) Field of Classification Search ............. 455/414.1, 455/414.2, 412.2, 456.1, 456.3
See application file for complete search history.

(56) References Cited

U.S. PATENT DOCUMENTS 6,526,275 B1 *  2/2003   Calvert ........................ 455/418
6,647,257 B1 * 11/2003   Owensby .................. 455/414.1
6,754,485 B1 *  6/2004   Obradovich et al. ..... 455/414.1

FOREIGN PATENT DOCUMENTS

| JP | 10-336127 | 12/1998 |
|----|-----------|---------|
| JP | 11-65434  | 3/1999  |
| JP | 11-338870 | 12/1999 |

OTHER PUBLICATIONS

New Riverside University Dictionary, Copyright 1984 by Houghton Mifflin Company, pp. 381 and 642.*

* cited by examiner

*Primary Examiner*—Matthew D. Anderson
*Assistant Examiner*—Sanh Phu
(74) *Attorney, Agent, or Firm*—Bacon & Thomas, PLLC (57) ABSTRACT

In the present invention, advertisements are transmitted electronically at designated locations, as a substitute for stationary billboards. A network navigation center outputs guide access information GAI to a personal computer of an ad sponsor over the Internet and receives registration of advertisement information ADI for the designated location(s) from the personal computer of the ad sponsor according to the guide access information GAI. In addition, the network navigation center receives current position information API from mobile communication device(s) carried by automobile, via a mobile telephone base station and a public telephone network. Likewise, the network navigation center transmits the advertisement information ADI, based on current position information API, to the mobile communication instrument via the public telephone network and mobile telephone base station.

1 Claim, 7 Drawing Sheets

APPARATUS AND METHOD FOR DELIVERY OF ADVERTISEMENT INFORMATION TO MOBILE UNITS

BACKGROUND OF THE INVENTION

1. Field of the Invention

The present invention relates to an apparatus and method for delivery of advertisements to mobile units as they pass a given location. The present invention also relates to a mobile communication instrument for receiving the advertisements and to recording media for use therewith.

2. Description of the Prior Art

Generally, roadside billboards are an effective means for delivering an advertising message to travelers, both walkers and drivers. Therefore, there is a high level of demand for billboard (signboard) advertising which is widely used by restaurants, automobile dealers, supermarkets, convenience stores, bookstores, hospitals, hotels, other service industries and manufacturers. In addition, for drivers looking for a stop, for example a restaurant for lunch, a billboard advertisement of a restaurant is very useful.

However, the size of roadside billboards limits the number that can be placed in the same location. Thus, in some locations spatial limitations prevent placement of any new billboard.

Moreover, because erection of new billboards is regulated for the sake of aesthetics and preserving the natural environment, not only are drivers unable to obtain desirable information but also local businesses are unable to advertise. On the other hand, in areas crowded will billboards, it was difficult for walkers and drivers to recognize a billboard advertisement of interest.

SUMMARY OF THE INVENTION

A first object of the present invention is to provide a mobile advertisement information delivery method, mobile advertisement information delivery system and recording medium whereby the sponsor of an ad can deliver an advertisement message to persons passing by a given location.

A second object of the present invention is to provide an advertisement information delivery system capable of easily changing the advertisement information delivered to persons passing by.

A third object of the present invention is to provide an advertisement information delivery system capable of delivering selected advertisement information to persons passing by a given location.

A fourth object of the present invention is to provide an advertisement information delivery system capable of guiding persons passing by the given location to the advertised location.

A fifth object of the present invention is to provide an advertisement information registration system and recording medium capable of accurately setting the location at which the advertisement is to be presented to a mobile unit.

A sixth object of the present invention is to provide advertisement information charge system and recording medium capable of easily calculating advertisement delivery charges.

A seventh object of the present invention is to provide a mobile communication instrument capable of acquiring advertisement information merely by passing a location presenting the advertisement.

Accordingly, in one aspect, the present invention is a mobile advertisement information delivering method which includes delivering advertisement information from an advertisement information delivery apparatus to a mobile communication instrument, based on current position information transmitted therefrom.

In another aspect, the present invention is a mobile advertisement information delivering method for delivering advertisement information from a computer system to a mobile. communication instrument, which method includes storing advertisement information at a location for presentation of the advertisement set by sponsor of the ad, receiving current position information from the mobile communication instrument, retrieving advertisement information relating to the current position from the stored advertisement information, based on the current position information received from the mobile communication instrument, delivering the retrieved advertisement information to the mobile communication instrument, calculating advertisement delivery charges incurred by the delivery, and charging the calculated advertisement delivery charges to the sponsor of the ad.

The present invention also provides a mobile advertisement information delivering system including advertisement information storage means for storing advertisement information to be presented at a location set by the sponsor of the ad, a mobile communication instrument for detecting current position, for transmitting current position information, for receiving the advertisement information and for outputting the received advertisement information through an output section, i.e., screen display and/or speaker, and advertisement information delivery means for receiving current position information from the mobile communication instrument, for retrieving from the advertisement information storage means advertisement information relating to either a location for presenting advertisement information agreeing with the current position or a location for presenting advertisement nearby the current position and for delivering the retrieved advertisement information to the mobile communication instrument.

The advertisement information delivery means may include delivery data storage means for storing data for the number of times of advertisement information has been delivered to mobile communication instruments. Alternatively, the advertisement information delivery means may include use data storage means for storing the number of times a mobile communication instrument is to be a delivery target of advertisement information, each time advertisement information is delivered thereto.

The advertisement information relating to a given location for presentation of the advertisement information stored in the advertisement information storage means may include image data for presenting an image of at least one advertisement inclusive of e.g., trade name, pet name, business description, brand name, or guide map, in which case the output component of the mobile communication instrument is a display for displaying an advertisement thereon based on the image data.

The advertisement information storage means may contain directions or a map for guiding travel from the current position to an advertised location, to enable display of a route from the current position to the advertised location on the display of the mobile communication instrument.

The advertisement information delivery system may also include delivery condition storage means for storing delivery conditions for advertisement information whereby the advertisement information delivery means determines delivery to the mobile communication instrument according to the stored delivery conditions. The stored delivery conditions may include, for example, calender period of presentation, presentation time of day, age group, and/or gender(s).

In one preferred embodiment the mobile communication instrument is a navigation device carried by a vehicle and includes a transmitter for transmitting current position information to the advertisement information delivery means and a receiver for receiving the advertisement information.

The transmitter and receiver may be a mobile telephone. Further, the mobile telephone may be provided with current position detecting means for detecting current position.

In yet another aspect the present invention provides a mobile advertisement information registration system including advertisement information delivery means for delivering advertisement information to a mobile communication instrument based on current position information transmitted from the mobile communication instrument, advertisement information input means for inputting advertisement information by a sponsor of an ad, advertisement information storage means for storing the input advertisement information, and management means for delivering data from said advertisement information input means over the Internet and for writing advertisement information from said advertisement information input means into the advertisement information storage means. The advertisement information input means may be a personal computer or a mobile communication instrument.

The mobile advertisement information registration system may further include delivery condition storage means for storing delivery conditions relating to said advertisement information whereby delivery conditions are input along with said advertisement information by said advertisement information input means and so are stored in correlation therewith by the management means. Again, the delivery conditions may include presentation calender period, presentation time of day, age group and/or gender(s).

The mobile advertisement information registration system according to the invention may further include price information storage means for storing delivery price relating to at least one of the advertisement information and a delivery condition, whereby the management means may retrieve the delivery price and output same to the advertisement information input means. The mobile advertisement information registration system may also include the aforementioned delivery data storage means.

In yet another aspect, the present invention is a mobile advertisement information charge system including charge management means for calculating, based on advertisement contents and/or delivery condition(s), advertisement delivery charges for advertisement information delivered from advertisement information delivery means to a mobile communication instrument, in accordance with current position information transmitted therefrom.

In one embodiment, the mobile advertisement information charge system of the present invention includes advertisement information storage means for storing advertisement information to be presented at a location set by a sponsor of an ad, advertisement information delivery means for delivering advertisement information to a mobile communication instrument, based on current position information transmitted from the mobile communication instrument, advertisement delivery charge storage means for storing advertisement delivery charges for delivery of the advertisement information, and management means for calculating advertisement delivery charges based on delivery prices relating to at least one of advertisement information content delivered and an advertisement information delivery condition, and for storing the calculated charges in the advertisement delivery charge storage means. Alternatively, the management means may calculate advertisement delivery charges based on number of times of delivery of advertisement information and delivery charges stored in the advertisement delivery charge storage means. In yet another alternative, the management means calculates advertisement delivery charges based on the amount of communication data delivered and delivery charges stored in the advertisement delivery charge storage means.

In yet another aspect, the mobile advertisement information charge system includes charge management means for calculating, based on number of times of delivery of advertisements, delivery charges for advertisement information delivered from advertisement information delivery means to a mobile communication instrument based on current position information transmitted therefrom.

Alternatively, the management means calculates, based on the amount of advertisement communication data, delivery charges for the advertisement information delivered from advertisement information delivery means to a mobile communication instrument, based on current position information transmitted therefrom.

The mobile advertisement information charge system of the present invention may additionally include price information storage means for storing delivery charges correlated with at least one of the advertisement information and delivery condition, in which case the management means may calculate advertisement delivery charges based on number of times of delivery and delivery charges for the delivered advertisement information each time the advertisement information is delivered. These calculated advertisement delivery charges are then stored in the advertisement delivery charge storage means.

In yet another aspect, the present invention provides a mobile communication instrument having current position detecting means for detecting current position and a display for displaying picture images, storage means for storing advertisement information beforehand related to locations where the advertisements are to be presented, and advertisement presentation control means for presenting advertisement information relating to a given location where the advertisement information is to be presented on said display when the current position detected by said current position detecting means agrees with said given (presentation) location.

The present invention may also be embodied in a recording medium storing an advertisement information registration program for execution by a computer, the program including prompting an ad sponsor to input the presentation location(s) for presenting an advertisement, storing of the input presentation location(s), prompting the ad sponsor to input the advertisement to be presented at the designated (presentation) location(s), storing the input advertisement correlated with the designated location(s), input by the ad sponsor of advertisement delivery condition(s), and storing the delivery condition(s) input by the ad sponsor.

In yet another embodiment, the present invention provides a recording medium having, stored therein, an advertisement information delivery program for execution by computer, the program including the steps of inputting of current position information from a mobile communication instrument, retrieving from storage advertisement information related to a designated location for presenting advertisement when the designated location corresponds to the input current position or to a location nearby the input current position, and retrieving advertisement information to the mobile communication instrument.

In another embodiment of the present invention a recording medium contains stored therein an advertisement information charge program for execution by computer, the program including the steps of calculating advertisement delivery charges generated by delivery for each ad sponsor, preparing details of advertisement information delivered to each sponsor of the ad during a given time period and advertisement delivery charges, withdrawing advertisement delivery charges to each sponsor from the ad sponsor's bank account, and preparing details of advertisement information delivered and advertisement delivery charges as statements.

The present invention may also be embodied in a recording medium containing, stored therein, an advertisement information presenting program for execution by computer, the program including the steps of computing current position and transmitting said computed current position information, and receiving and displaying an advertisement based on the transmitted current position information.

DESCRIPTION OF THE PREFERRED EMBODIMENT

Figure 1:
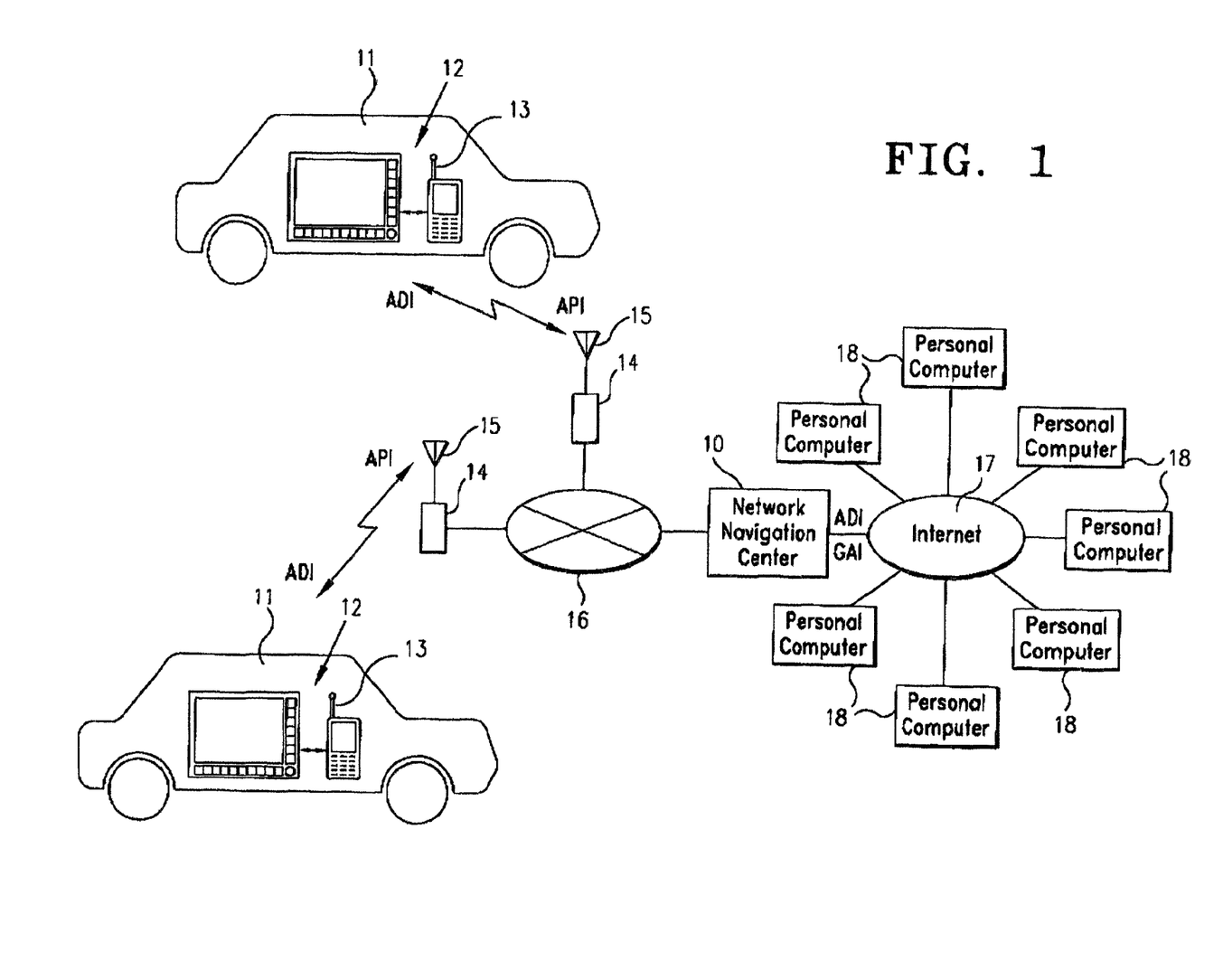
FIG. 1 is a block diagram of a mobile advertisement information delivery system of an embodiment according to the present invention.

One example embodying the present invention will now be explained with reference to the drawings. FIG. 1 shows the configuration of a mobile advertisement information delivery system as including a network navigation center 10 having a computer system for transmitting and receiving. More specifically, the network navigation center 10 transmits, to a mobile communication instrument 12 carried by automobile 11 of an advertisement information user, advertisement information ADI which the user wants to acquire and receives various items of information including current position information API of the user from the mobile communication instrument 12. The various items of information are transmitted from the mobile communication instrument 12 by radio signal via antenna 13. Radio signals are received by a base station antenna 15 of a mobile telephone base station 14 and transmitted via a public telephone network 16 to a network navigation center 10. Likewise, various items of information from network navigation center 10 are transmitted by radio signal from the base station antenna 15 of the mobile telephone base station 14 via the public telephone network 16 and received by antenna 3 of the mobile communication instrument 12. In other words, network navigation center 10 is connected to mobile communication instrument 12 carried by automobile 11 over the so-called wireless Internet. Instead of connecting mobile communication instrument 12, such as carried by automobile 11, with network navigation center 10 via the public telephone network 16, mobile communication instrument 12 may be directly connected with network navigation center 10 over wireless Internet by providing a radio receiver/transmitter, a TA (Terminal Adapter) and a DSU (Digital Service Unit) at the mobile communication instrument side.

Network navigation center 10 connects with a personal computer 18 of each ad sponsor, serving as advertisement information input means, over Internet 17. In this manner, network navigation center 10 transmits and receives from personal computer 18 various items of information including advertisement information ADI for delivering advertisements at locations designated for presenting advertisements selected by the ad sponsors and guide access information GAI for guiding the ad sponsor in inputting advertisement information ADI. It should be noted that if the ad sponsor's personal computer 18 is equipped for wireless communication, the personal computer 18 and the network navigation center 10 may be connected over wireless Internet. Alternatively, the ad sponsor may employ a mobile telephone to deliver various items of information to network navigation center 10.

Figure 2:
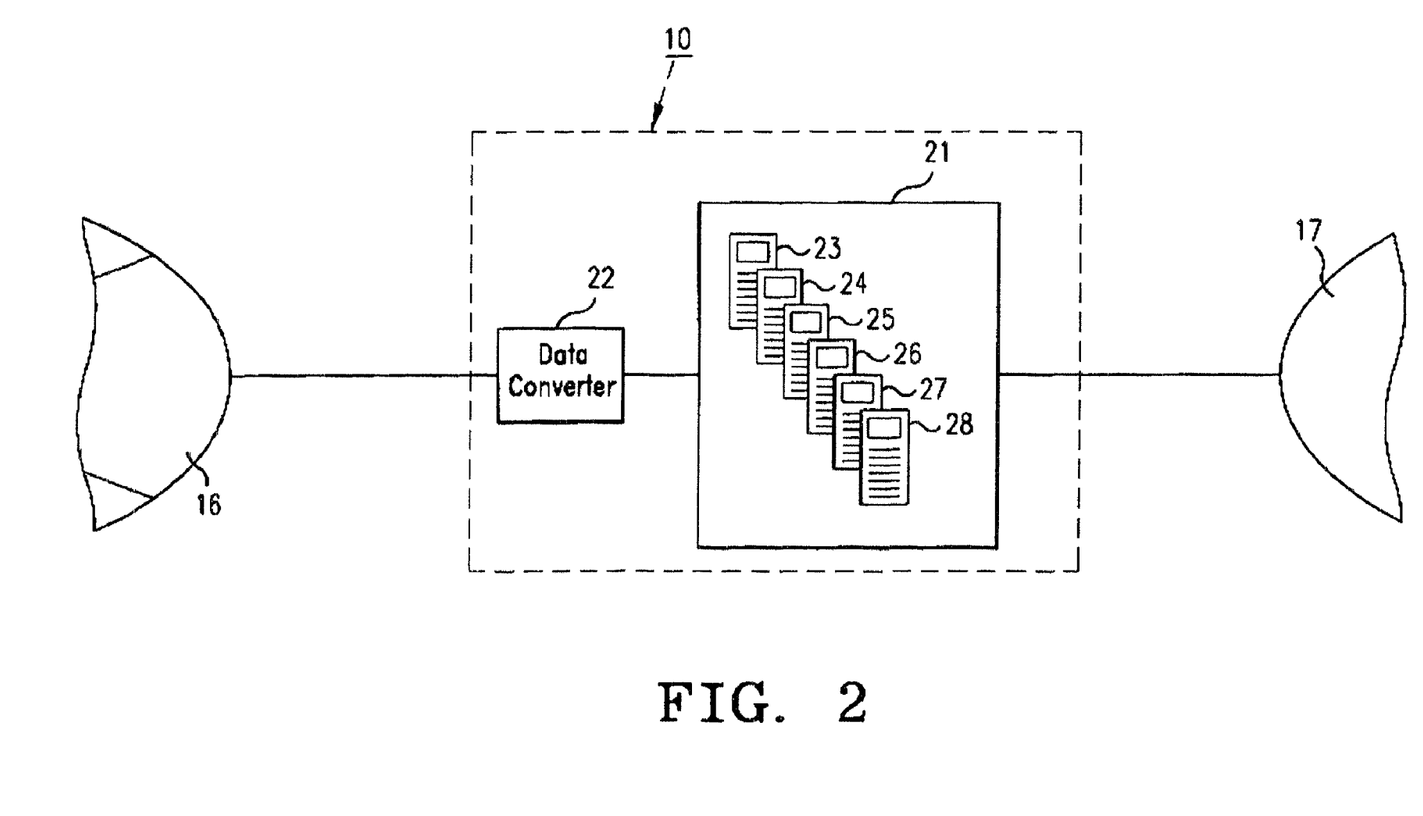
FIG. 2 is a block diagram of architecture of a network navigation center utilized in the present invention.

Network navigation center 10, as shown in FIG. 2, is composed of server group 21 and data converter 22 comprising an advertisement information delivery apparatus. Server group 21 includes map server 23, advertiser/user server 24, designated location for presenting advertisement/ advertisement information server 25, charge server 26, authentication server 27 and management server 28.

Map server 23 stores and manages map data (road maps, residential area maps, building geometry maps, etc.), intersection data, address data, etc. Advertiser/user server 24, serving as sponsor data storage means, stores and manages data related to users of the advertisements. Sponsor data is composed of name data, address data, business content data (data related to type of goods and/or services that the ad sponsor provides, e.g., food and beverage business, automobile sales, convenience store, internal medicine, hotel, etc.). User data is composed of name data, address data, age data, distinction of gender(s) data, occupation data, mobile telephone number, make of automobile 11, car type (sedan, recreational vehicle, etc.) and vehicle name data.

Designated location server 25 serves as advertisement information storage means and stores and manages data for the designated locations and guide position data for guiding the user to the location mentioned in the advertisement. A designated location in the present embodiment is a position specified in map data stored in map server 23 and expressed as latitude and longitude. Advertisement data in the present embodiment includes trade name, pet name, business content, brand name or advertisement image data for drawing an advertisement picture and guide map and advertisement voice data for announcing the advertisement to the user by voice. Guide position data in the present embodiment is a position specified by map coordinates stored in map server 23, in the same manner as designated locations for presenting advertisement data and is expressed as latitude and longitude.

Also, designated location/advertisement information server 25 stores and manages travel direction data for selecting which user or users should be delivered an advertisement in accordance with the direction of travel in passing by the designated location for presenting the advertisement. In the present embodiment, travel direction data, designated location for presenting advertisement data, advertisement data (advertisement image data, advertisement voice data) and guide position data are all treated as advertisement data.

Furthermore, designated location for presenting advertisement/advertisement information server 25 comprises delivery condition storage means for storing and managing delivery condition data relating to delivery conditions, i.e., a condition or conditions which govern when and/or if an advertisement is to be presented. Delivery condition data in the present embodiment is comprised of presentation calender period data, presentation time of day data, age group data, distinction of gender(s) data, data regarding automobile manufacturer, data regarding car type and vehicle name data.

Presentation calender period data is data relating to the calender period for delivering the advertisement, such as for example from August 1 to December 31. Presentation time of day data is data relating to the time of day the advertisement is to be presented, such as for example from 9:30 p.m. to 10:00 a.m. Age group data is data relating to the age of the users to be delivered the advertisement, such as for example 18 years old-55 years old. Distinction of gender(s) data is data relating to the gender(s) of the user to be delivered the advertisement, such as for example males only. Data by automobile manufacturer is data relating to the maker of the automobile 11 owned by users to be delivered the advertisement. Data by car type is data relating to the type of the automobile 11 owned by the users to be delivered the advertisement, such as for example sedan or recreational vehicle. Car name data is data relating to the name of the automobile 11 owned by the users to be delivered the advertisement.

Charge server 26 serves as price information storage means for storing and managing price data relating to delivery price of the advertisement delivered to the users. Price data in the present embodiment is composed of designated location for presentation price data, presentation calender period price data and presentation time of day price data. Designated location for presentation price data wherein price is classified according to the designation (presentation) location and is determined beforehand for each designated location in the map data stored in map server 23, such as for example all locations by roadside. Presentation time (calender) period price data is data relating to the calender period for delivering the advertisement and is determined according to the calender period beforehand. Presentation time of day price data is data relating to price classified by time of day for presenting the advertisement and is determined beforehand according to each time period.

In addition, charge server 26 comprises number of deliveries storage means, advertisement delivery charge storage means and use number of times storage means, and stores and manages number of deliveries data related to number of deliveries for every advertisement delivered to users, advertisement delivery charge data related to advertisement delivery charges to ad sponsors and user list data related to the users who received advertisement delivery for every advertisement.

Authentication server 27 stores and manages ad sponsor authentication data consisting of ID code, password and bank account number to be billed or charged advertisement delivery charges, and user authentication data consisting of the user's ID code and password.

Management server 28 serves as advertisement information delivery means or management means for supervising and managing each server 23 to 27, connects with the personal computers of each ad sponsor over the Internet 17 and connects with mobile communication instrument 12 by means of data converter 22, public telephone network 16 and mobile telephone base station 14. Management server 28 comprises a recording medium which stores an advertisement information registration program, an advertisement information delivery program and an advertisement information charge program therein.

Management server 28 executes various arithmetic processing operations according to the advertisement information registration program, advertisement information delivery program and advertisement information charge program. The advertisement information registration program is a program which registers advertisements, to be delivered to users of communication instruments 12, with network navigation center 10 for each personal computer 18. The advertisement information delivery program is a program which delivers advertisements registered by personal computers 18 from network navigation center 10 to mobile communication instruments 12. The advertisement information charge program is a program which calculates advertisement delivery charges generated by advertisement delivery to the users and which bills ad sponsors for advertisement delivery charges.

Figure 8:
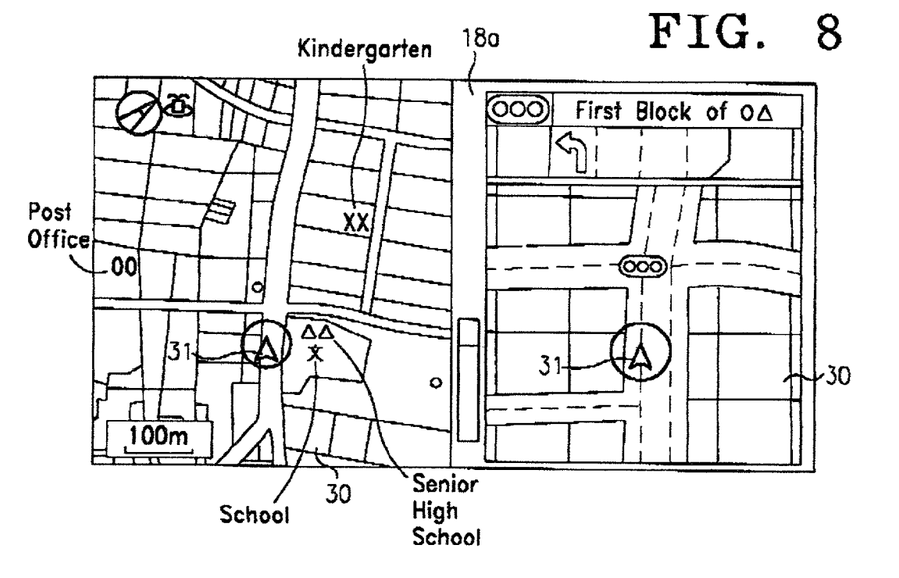
FIG. 8 shows a map display with designated location for presenting an advertisement.

The step of registering of an advertisement utilizing the advertisement information registration program will now be explained. First, when the network navigation center 10 is accessed from personal computer 18 over Internet 17, management server 28 executes an advertisement application by interaction with a personal computer 18 of an ad sponsor based on the advertisement information registration program. Management server 28 reads map data, intersection data and address data from map server 23, based on the advertisement information registration program, and outputs this retrieved data to personal computer 18 to generate thereon a display providing for selection (designation) of a present location for presenting the advertisement. More specifically, personal computer 18 displays a map based on map data, etc., and indicates the effect of the selection to assist the sponsor in selecting the presentation location. If an ad sponsor wants to specify a guide route, then it is assumed that guide route can be set on the screen of personal computer 18. In executing this selection program, the management server 28 may enlarge the display from a wide area map to a detailed map based on key operation or mouse control of personal computer 18, with scrolling of the picture displays on the screen of the personal computer 18 of the map on which the presentation location for presenting advertisement is shown.

or example, when map 30 for indicating the designated location for presenting advertisement is displayed on the screen 18a of personal computer 18 as shown in FIG. 8, management server 28 displays the effect of specifying the designated location with arrow cursor 31 responsive to key operation or mouse operation of personal computer 18. An ad sponsor operates the key or mouse of personal computer 18 to put cursor 31 at the designated location for roadside advertisement (designated location). Then, direction of the arrow of cursor 31 is also selected, thereby selecting the travel direction of the user to be delivered the advertisement passing by the designated location for presenting the advertisement. Alternatively, by displaying a residential area map showing the configuration of buildings on display screen 18a, the designated location for presenting advertisement may be selected as at least one configuration region.

Also, in the case where the advertisement is to be delivered to users passing the designated location for presenting advertisement in either direction, the selecting of both directions may also be done by operation of key or mouse of personal computer 18. The selection is effected by placing the cursor 31 on each corner of the intersection of the crossroads, etc.

Figure 9:
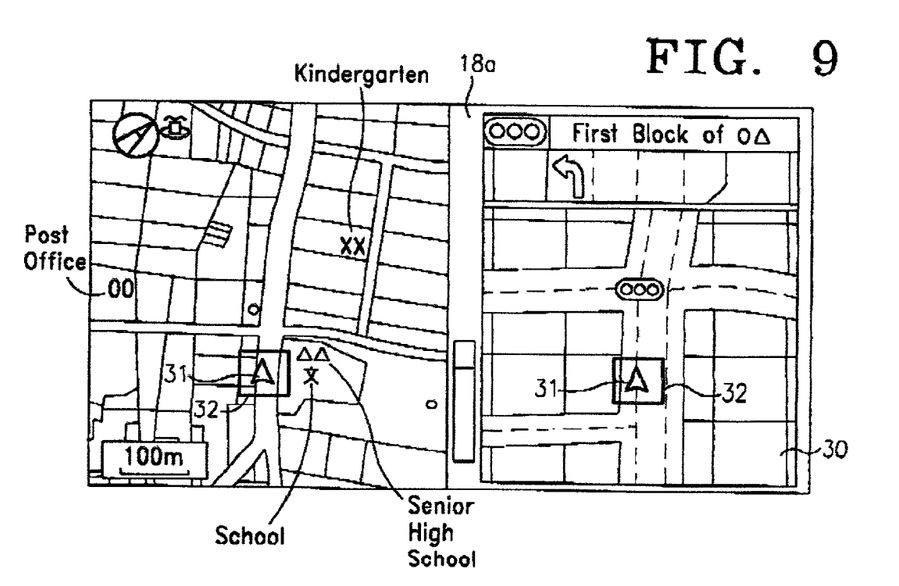
FIG. 9 shows a map display with each corner of the crossroad as the designated location for presenting an advertisement.
Figure 10:
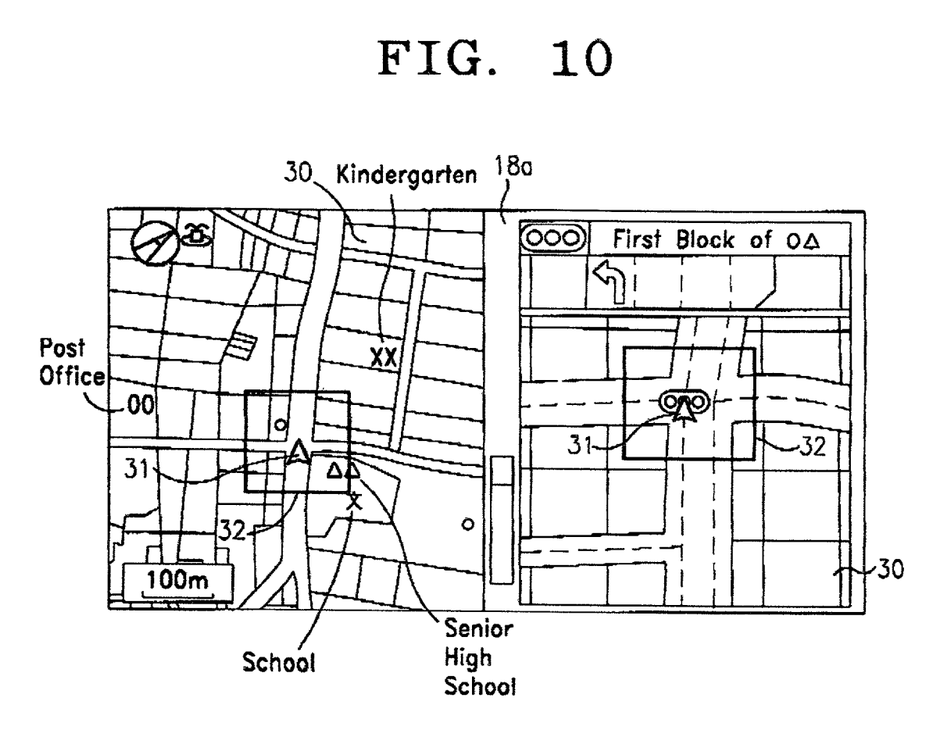
FIG. 10 shows a map display with a square frame indicating selection of each corner of the crossroad as the designated location for presenting an advertisement.

When the location for presenting advertisement is designated by personal computer 18, management server 28 displays the provisional scope of the advertisement on display screen 18a of personal computer 18. In the present embodiment, a square frame 32 surrounding cursor 31 is displayed as shown in FIG. 9 to inform the ad sponsor that the advertisement is provided within the scope of square frame 32. In this manner, an ad sponsor can verify the scope of the advertisement delivered to users. In addition, FIG. 10 shows the display condition of square frame 32 when all corners of the crossroads were selected.

If a key or mouse is operated in order to designate the location for presenting the advertisement, management server 28 temporarily stores data for the designated location for presenting the advertisement and travel direction data related to travel direction in the storage means of management server 28.

Management server 28 displays a first demand for advertisement image data of the advertisement to be presented at the designated location on the personal computer 18 of the ad sponsor. Then management server 28 displays a notice demanding input of a voice message for the advertisement.

In response to these demands the ad sponsor inputs both the advertisement image data and the advertisement voice data through personal computer 18 to management server 28. Management server 28 then stores the received advertisement image data and advertisement voice data temporarily correlated with the aforementioned designated location for presenting advertisement data and travel direction data in the storage device of management server 28.

The management server 28 next displays a notice to personal computer 18 of an ad sponsor inquiring whether or not a guide route for guidance from the designated location to the ad sponsor's location related to the content of the advertisement is to be displayed. If provision of a guide route is selected by operating the key or mouse of personal computer 18, management server 28 outputs map data to personal computer 18, in the same manner as previously described for designation of location(s) for presenting advertisement, to display a map on the monitor of the personal computer 18. The ad sponsor executes his/her selection in the same manner as described above by operating a key or mouse of personal computer 18 to place cursor 31 on the roadside guide location (guide position) indicated on map 30. Management server 28 temporarily stores guide position data related to guide location in storage device in management server 28.

The management server 28 next displays on screen 18a of the personal computer 18 of the ad sponsor a notice for selecting delivery conditions such as calender period, presentation time(s) of day, age group of users to receive the advertisement, gender(s) of the users to receive the advertisement, the manufacturer of the automobile of the users to receive the advertisement, car type and car name, etc.

Again, by operation of the key or mouse of personal computer 18, the ad sponsor selects an advertisement delivery calender time period, delivery times of day, age group of users to be delivered the advertisement, gender(s) of users to be delivered the advertisement, the manufacturer of the automobile of users to be delivered the advertisement, the car type and the car name. For example, the presentation calender period may be set as "20xx April 1 to 20xx October 14" and the presentation time of day may be set as "from 10:00 a.m. to 9:30 p.m."; age group of users may be set as "20 years old–55 years old"; the user gender(s) may be set as "both male and female". Likewise, the automobile manufacturer may be designated as "x x x line automobile industry" or car type as "a recreational vehicle" or car name as "x x x". After finishing the setting of delivery conditions, management server 28 temporarily stores the set presentation calender period data, presenting time of day data, age group data, gender data, automobile manufacturer data, car type data and car name data, in the storage device of management server 28.

Management server 28 successively calculates delivery charges for the advertisement on the basis of the designated location for presenting the advertisement, presentation calender time period and presentation time(s) of day selected by the ad sponsor. More specifically, management server 28 reads price data stored in charge server 26 and calculates price of the designated location for presenting advertisement selected from price of designated location for presenting advertisement data, price of presentation calender time period selected from price of presentation calender period data and price of presentation time(s) of day selected from price of presentation time(s) of day data.

After calculating the advertisement delivery charge (=designated location for presenting advertisement price+presentation calender period price+presentation time(s) of day price), management server 28 displays an advertisement, displays the calculated delivery charge and its details on the monitor of personal computer 18 of the ad sponsor and displays a notice for the ad sponsor to select whether he/she wants to register the advertisement with acceptance of the delivery charge.

Registration is done by input of the ad sponsor's name, address, nature of business, ID code, password and bank account number by operation of key or mouse of personal computer 18 to register name (nomenclature), address, business contents, ID code, password and bank account number, which input data is temporarily stored by management server 28 in corresponding server 24. Thus, ad sponsor data such as name (nomenclature), business content and address are stored in, for example, advertiser/user server 24. Designated location for presenting advertisement, travel direction data, advertisement image data, advertisement voice data, guide position data, presentation calender period data, presentation time(s) of day data, age group data, gender data, automobile manufacturer data, vehicle type data and vehicle name data are stored in designated location information server 25. Authentication data such as ID code, password and bank account number of the ad sponsor are stored in authentication server 27.

After recognition of the password, registration of the advertisement in network navigation center 10 by the ad sponsor is completed. In other words, execution of the advertisement information registration program is finished. Thereafter, management server 28 executes the advertisement information delivery program in response to current position information API received from a mobile communication instrument 12. Data converter 22 reads out advertisement information ADI (in the present embodiment, designated location for presenting advertisement data, travel direction data, advertisement image data, advertisement voice data and/or guide data for guidance to the designated location. Management server 28 then converts advertisement information ADI read for delivery by data converter 22 and outputs the thus read ADI to mobile telephone base station 14 via public telephone network 16 and the advertisement information ADI is delivered to mobile communication instrument 12 from mobile telephone base station 14. Data converter 22 includes a signal processing circuit enabling advertisement information ADI read out from management server 28 to be output to mobile telephone base station 14 via public telephone network 16. Data converter 22 also includes a signal processing circuit enabling management server 28 to receive information output from public telephone network 16.

If the ad sponsor wants to change the advertisement information ADI, he may access network navigation center 10 and change data therein as desired after inputting ID code and password.

In the present embodiment, user data is stored and managed in advertiser/user server 24 based on the user's application submitted to network navigation center 10. In other words, by operation of personal computer in network navigation system 10, in accordance with an application sheet, user data consisting of, for example, name, address, age, gender, occupation, mobile telephone number, make of automobile 11, and/or vehicle type are stored in advertiser/user server 24. Then, user authentication data consisting of ID code and password are input together and stored in authentication server 27. Therefore, the user can change the address or mobile telephone number, if desired in the future, by use of the personal computer or mobile telephone over the Internet. Of course, as described above, the user can apply by on-line application without submitting an application sheet.

Figure 3:
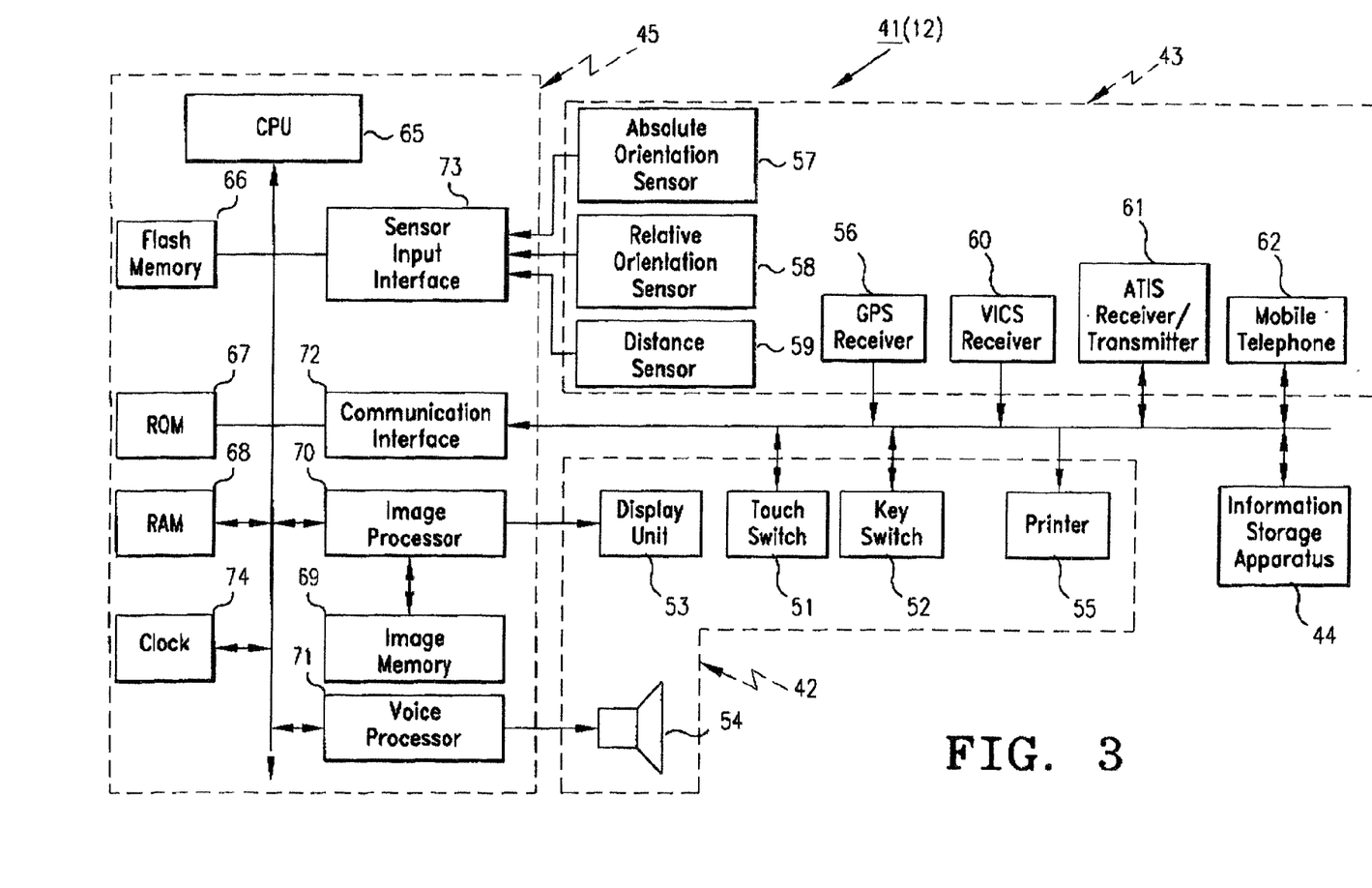
FIG. 3 is a block diagram of the architecture of a vehicle navigation device utilized in the present invention.

The mobile communication instrument 12, which is carried by automobile 11 and which receives the advertisement registered in network navigation center 10, may be embodied in a navigation device 41 which includes an input-output device 42, a current position detector 43, information storage unit 44 and main control unit 45, as shown in FIG. 3.

Input-output device 42 is a device for input of the driver's instructions regarding navigation processing to main controller 45 and for output of guide information by voice or screen image when the driver wants such guidance. Input-output device 42 also serves to instruct the main controller 45 to output advertisement by voice or screen image when the driver wants the advertisement information ADI registered in network navigation center 10.

Input-output device 42 includes touch switch 51, key switch (jog key and power switch) 52, display 53, speaker 54, and printer 55. Touch switch 51 is provided on screen 53a of display unit 53 and is used to request location, telephone number, position on map or guide path for guidance to the location mentioned in the advertisement. Key switch 52 is provided in the perimeter of display screen 53a and is used like touch switch 51 to request location, telephone number, position on map or guide path for the location mentioned in an advertisement.

Display unit 53 which serves as output apparatus is a color liquid crystal display and displays map 53b and advertisement 53c based on map data and drawing data, as shown in FIGS. 4 to 7, on screen 53a or automatically displays a guide path on screen 53a responsive to a request of the driver. Speaker 54, which also serves as part of the output apparatus, outputs an advertisement message and guidance to the advertised location ("guide path") by voice, based on advertisement voice data. Printer 55 records data processed by main controller 45 on chart recording paper.

Current position detecting apparatus 43 ("current position detecting means") detects or receives information related to current position of the vehicle 11. Current position detecting apparatus 43 may include a GPS receiver 56, an absolute orientation sensor 57, a relative orientation sensor 58, a distance sensor 59, a VICS (Vehicle Information and Communication System) receiver 60, an ATIS receiver/transmitter 61 and a mobile telephone 62.

GPS receiver 56 utilizes the GPS (Global Positioning System) to detect current position of vehicle, vehicle orientation, vehicle speed, etc. Absolute orientation sensor 57 is, for example, an earth magnetism sensor. Relative orientation sensor 58 may include a steering sensor, gyroscope, etc. Distance sensor 59 calculates the mileage from the number of revolutions of a wheel.

VICS receiver 60 is a unit for receiving road information by means of FM multiplex, radiowave beacon or light beacon. ATIS receiver/transmitter 61 is a receiver/transmitter for exchanging information needed for navigation with an ATIS (Advanced Traffic Information Service) by request of the driver.

Mobile telephone 62 receives advertisement information (designated location for presenting advertisement data, etc.) from network navigation center 10, transmitted via aerial 15 of mobile telephone base station 14 and public telephone network 16. Mobile telephone 62 transmits current position information API detected by vehicle navigation device 41, as current position of automobile 11, to mobile telephone base station 14 which transmits the current position information API to network navigation center 10 via public telephone network 16.

Information storage unit 44 is a recording medium which stores navigational programs and data. The navigation programs include a map drawing routine, a path retrieving routine, a guide path guidance routine, current position calculation routine, destination position setting routine, etc., and consists of application and operation systems for processing navigational signals. In other words, a program for retrieving a guide path, etc., a program for display control for display of the guide path, a program for voice output control for voice guidance, data needed for execution of these programs and further display information needed for the guide path display and map display are stored in information storage unit 44.

More specifically, the first mentioned program sets destination and/or a point to be passed, based on current position from current position detecting apparatus 43 and input signals from touch switch 51 or key switch 52, and retrieves a route from road retrieval data. This program also changes the road retrieval data as necessary based on traffic information acquired from VICS receiver 60 or ATIS receiver/transmitter 61 and again executes route retrieval. Another program determines map drawing, map matching, voice output timing and voice phrases along the route.

The stored data includes map data (road maps, residential area maps, building geometry maps, etc.), intersection data, node data, road data, photograph data, registered location data, destination data, destination read data, telephone number data, address data and all other data needed for operation of the navigation device. In the present embodiment, these data items are the same as those stored in map server 23 of the aforementioned network navigation center 10.

Information storage unit 44 also stores an advertisement delivery program. The advertisement delivery program outputs the advertisement on display 53 and by speaker 54 of input-output device 42. More specifically, it includes a routine for transmitting current position information API of automobile 11 from mobile telephone 62 to network navigation center 10, a routine for receiving advertisement information ADI from network navigation center 10 by mobile telephone 62 and for transmitting the received advertisement information ADI to main controller 45, a routine for outputting an advertisement registered in said network navigation center 10 by display 53 and speaker 54, when the automobile 11 arrives at the designated location for presenting the advertisement in the course of travel in the direction registered in network navigation center 10, and a routine for requesting the driver to select, on the basis of advertisement output on display 53 or by speaker 54, a guide path to the location mentioned in the advertisement from the designated location where presented the advertisement and for executing route (guide path) retrieval when selected.

Main controller 45 includes a CPU (Central Processing Unit) 65, a flash memory 66, ROM 67, RAM 68, image memory 69, image processor 70, voice processor 71, communication interface 72, sensor input interface 73 and clock 74.

CPU 65 executes the various programs. Flash memory 66 stores a navigational program and the advertisement delivery program read from information storage unit 44. ROM 67 stores a program for checking and updating the programs stored in flash memory 66.

Random access memory 68 ("memory means") stores retrieved guide path information such as coordinates of the set destination or road segment number, etc. or data temporarily in processing. RAM 68 temporarily stores advertisement information ADI (designated location for presenting advertisement data, etc.) delivered from network navigation center 10 and received by mobile telephone 62.

Image memory 69 temporarily stores image data of map 53b and advertisement image data of advertisement 53c to be displayed on screen 53a of display unit 53. Image processor 70 picks up image data from image memory 69 based on display control signals from CPU 65 and, after image processing, displays map 53b on display unit 53. In addition, image processor 70 picks up advertisement information ADI (advertisement image data) received in RAM 68 from network navigation center 10, based on display control signals from CPU 65, temporarily stores the ADI in image memory 69 and, after image processing, displays the advertisement 53c on display unit 53.

Voice processor 71 synthesizes voice from driving guidance data read from information storage apparatus 44, based on voice output control signals from CPU 65, as phrase(s), single sentence, and sounds and converts same into analog signals for output to speaker 54. In addition, voice processor 71 converts advertisement information ADI (advertisement voice data) received from network navigation center 10 by RAM 68 into analog signals, based on voice output control signals from CPU 65 and outputs the advertisement by voice from speaker 54.

Communication interface 72 delivers data to and from GPS receiver 56 of current position detecting apparatus 43, VICS receiver 60, ATIS receiver/transmitter 61, mobile telephone 62 and main control unit 45. Sensor input interface 73 imports sensing signals from absolute orientation sensor 57 of current position detecting apparatus 43, relative orientation sensor 58 and distance sensor 59. Clock 74 enters internal diagnostic information with date and clock time.

CPU 65 in main controller 45 performs the essential functions of vehicle navigation device 41, based on the navigational program which is read out from information storage unit 44 and stored in flash memory 66. In other words, CPU 65 calculates current position at a constant interval of clock time, based on data acquired from current position detector 43, and temporarily writes the current position into RAM 68. The calculated current position is based on data processed by map matching, taking into consideration detection errors in the various data. For output of a guide path, CPU 65 selects a driving means, i.e., either screen display or voice output, in response to operation of touch switch 51 or key switch 52.

The operation of vehicle navigation device 41 is as described below. Since the essential functions of vehicle navigation device 41 such as current position detection, map display, route retrieval and guide path display are similar to those of conventional operation, interaction between vehicle navigation device 41 and network navigation center 10 is described only to a limited extent.

Figure 4:
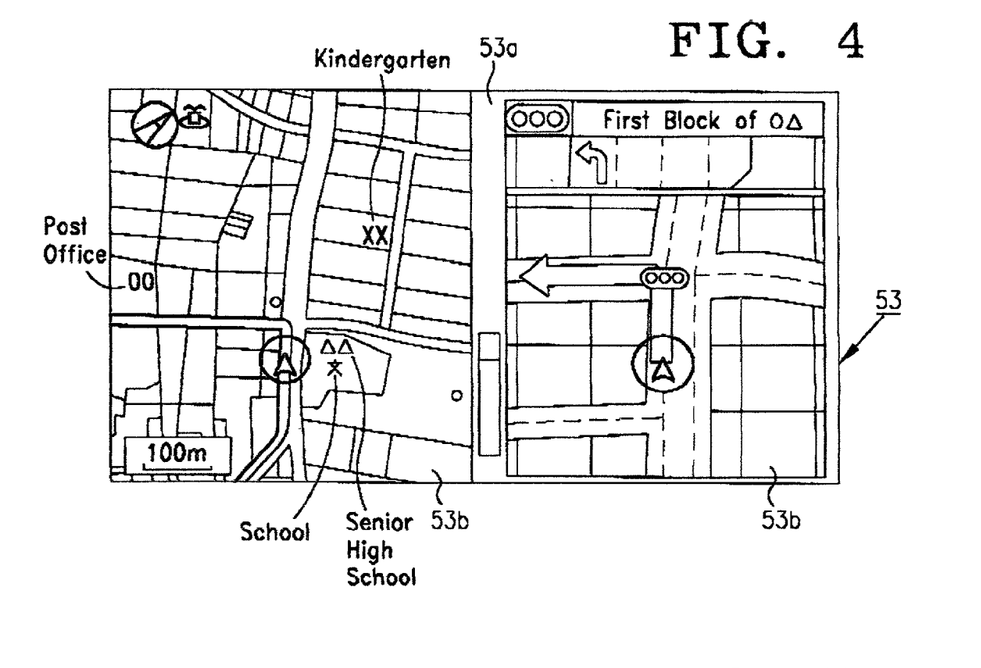
FIG. 4 illustrates, by way of example, maps displayed on the screen of the display unit of the vehicle navigation device of FIG. 3.

The advertisement information API of each ad sponsor is registered in server group 21 of network navigation center 10. The vehicle navigation device 41 carried by automobile 11 calculates current position of the automobile at a constant interval and displays the calculated current position on map 53b displayed on screen 53a of display unit 53 as cursor 53d. Furthermore, vehicle navigation device 41 is set in a mode to receive delivery of the advertisement by the operation of touch switch 51 or key switch 52.

In this condition, CPU 65 of vehicle navigation device 41 outputs current position information API related to the current position and travel direction information related to travel direction calculated at a constant time interval according to the advertisement delivery program, the output going to mobile telephone 62 via communication interface 72. Mobile telephone 62 calls mobile telephone base station 14 in response to input current position information API and enables communication with network navigation center 10 via public telephone network 16. Mobile telephone 62 transmits input current position information API and travel direction information to network navigation center 10. The mobile telephone number of mobile telephone 62 and IP (Internet Protocol) address are transmitted to network navigation center 10 along with the current position information API and travel direction information.

When current position information API, travel direction information, mobile telephone number and IP address are input through data converter 22, management server 28 of network navigation center 10 judges whether the user is registered in network navigation center 10 based on mobile telephone number and IP address input in accordance with the advertisement information delivery program. More specifically, it determines if the input numbers agree with the mobile telephone number and IP address of user data stored in advertiser/user server 24.

When neither the input telephone number nor the IP address agree, management server 28 determines that the person is not registered in network navigation center 10, and waits for new current position information API. On the other hand, when the telephone number and IP address do agree, management server 28 determines that the person is registered in network navigation center 10 and computes one or a plurality of travel paths that seem to have been traced by automobile 11 based on current position information API and travel direction information.

Subsequently, management server 28 determines whether or not there is a designated location for presenting advertisement registered within a certain distance from the current position of the automobile 11 on the computed travel path. In other words, a search is made in the designated location for data stored in server 25. When there is no designated location for presenting an advertisement within a certain (predetermined) distance, management server 28 finishes execution of the advertisement information delivery program and waits for the next, new current position information API etc.

On the contrary, when one or a plurality of designated locations for presenting an advertisement is found within the predetermined distance, management server 28 reads out advertisement data relating to that designated location(s) (advertisement image data and advertisement voice data), guide position data and delivery condition data (presentation calender period data, presentation time(s) of day data, age group data, gender data, automobile manufacturer data, vehicle type data and vehicle name data) from information server 25. Management server 28 judges whether or not the delivery conditions have been met and, when not met, the management server 28 exits the advertisement information delivery program and waits for the next, new current position information API, etc.

On the contrary, if advertisement data relating to a designated location for presenting advertisement that meets the conditions is found, management server 28 outputs the advertisement information ADI, for all designated locations that meet the conditions, to mobile telephone base station 14 via data converter 22 and public telephone network 16. Thus, one or a plurality of advertisements is/are transmitted from aerial 15 of mobile telephone base station 14 to mobile telephone 62 of the vehicle navigation device 41.

After transmission of the advertisement information ADI to mobile telephone 62 is completed (i.e., the execution of advertisement information delivery program is finished), management server 28 calculates the number of times of delivery of advertisements utilizing the advertisement information charge program and the advertisement delivery charges (=delivery charge×delivery number of times) and stores the number of times of delivery, delivery charge and name of user delivered the advertisement in charge server 26, temporarily stops execution of the advertisement information charge program and waits for the next, new current position information ADI and travel direction information.

On the other hand, when mobile telephone 62 receives one or a plurality of advertisements (advertisement information ADI), CPU 65 temporarily stores each item of advertisement information ADI in RAM 68 according to the advertisement delivery program.

CPU 65 compares the one or plural items of advertisement information ADI stored in RAM 68 with the current position information API computed by CPU 65 at a certain time interval and with travel direction information. In other words, data retrieval depends on whether or not there is found in RAM 68 a designated location for presenting an advertisement which agrees with the current position. And if there is no such agreement with the current position, CPU 65 stops the comparing operation until it computes a new current position and travel direction.

When a designated location for presenting advertisement is found in RAM 68 which agrees with the current position, CPU 65 judges whether or not the travel direction information agrees with travel direction data associated with the retrieved designated location. In making this judgement, the conventional technique of map matching is used, and the road currently traveled and the travel direction are determined by referring to the road data stored in map server 23.

When the travel direction does not agree, CPU 65 stops the comparison routine and waits for the next, new current position information API and travel direction information.

On the other hand, when travel direction at a designated location agrees, CPU 65 outputs the advertisement image data related in storage to the designated location from RAM 68 to image processor 70. Image processor 70 then processes advertisement image data based on display control signals from CPU 65 and displays the advertisement 53*c* on display unit 53.

Figure 5:
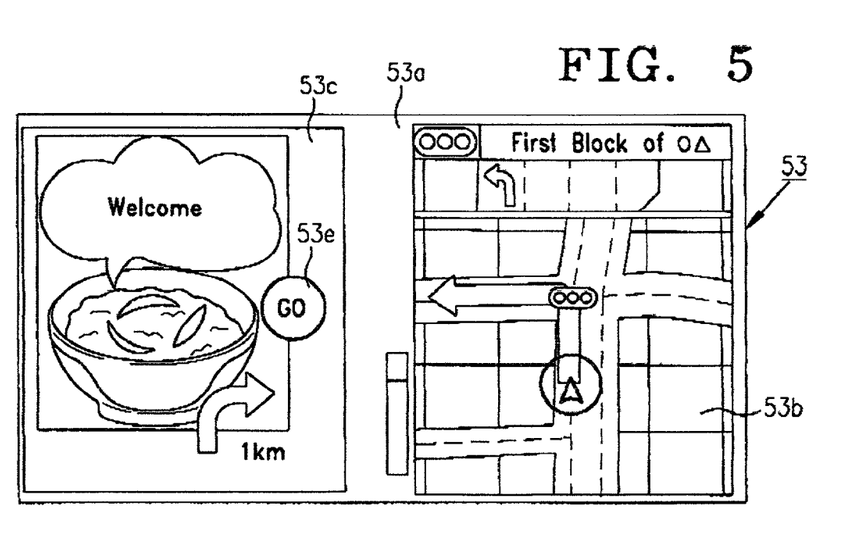
FIG. 5 shows an advertisement displayed on the screen of the display unit.

In other words, when automobile 11 arrives at a designated location for presenting advertisement, the map display on screen 53*a* of display 53 is replaced by an advertisement display. More specifically, the whole screen map display 53*a* shown in FIG. 4 is replaced by a display in which the right-half of the screen is map 53*b* and the left-half of screen is advertisement 53*c* based on advertisement image data as shown in FIG. 5. Then image processor 70 displays button 53*e* ("GO") on the advertisement location 53*c* in accordance with display control signals, based on the advertisement delivery program, from CPU 65.

In addition, CPU 65 outputs advertisement voice data related to the designated location to voice processor 71 from RAM 68. Voice processor 71 synthesizes voice from advertisement voice data based on voice control signals from CPU 65 and announces advertisements from speaker 54. For example, along with display of advertisement 53*c* shown in FIG. 5, a voice message such as "x x shop of Japanese food is 1 km from the next intersection after turning right", is announced from speaker 54.

Therefore, when automobile 11 passes by the designated location advertisement 53*c* is displayed on display unit 53 of vehicle navigation device 41 and the advertisement voice message is announced from speaker 54. As a result, the ad sponsor can deliver an advertisement to a driver without a billboard or roadside sign. In addition, a driver can acquire a desired advertisement on screen 53*a* and by voice, so that the driver is liberated from the inconvenience of searching for such information, especially when traveling a strange road.

Display, etc., of the advertisement at its designated location is executed only in the case that the travel direction of automobile 11 is oriented toward the advertised location (guide position). Therefore, the ad sponsor can save useless advertisement. Further, the vehicle driver is not bothered by watching or hearing advertisements presented at locations (guide position) already traveled.

Figure 6:
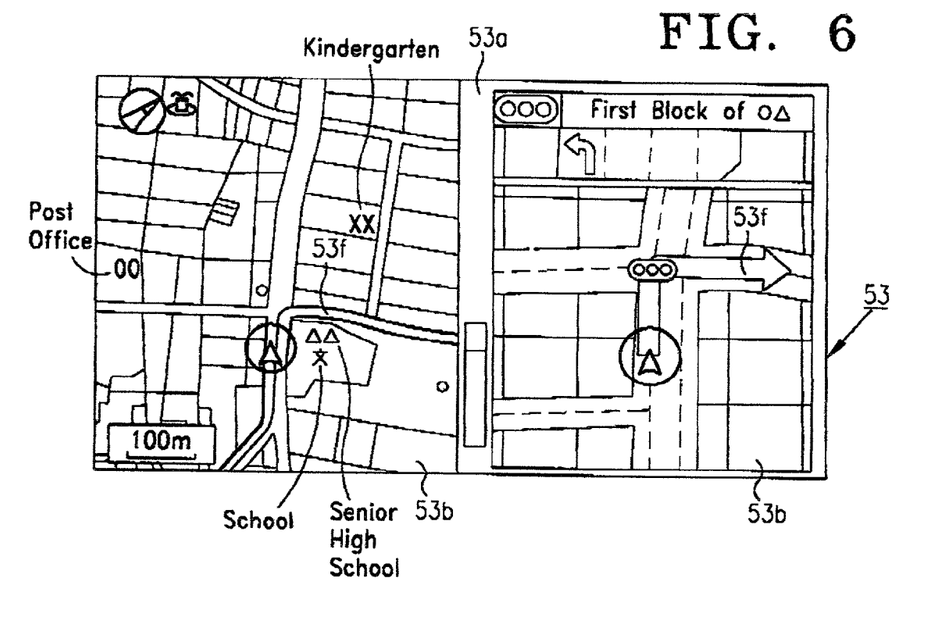
FIG. 6 illustrates display of a guide path to the advertised location (guide position) on a map displayed on the screen of the display unit.

Subsequently, when driver touches button 53*e* denoted "GO" displayed on screen 53*a* with advertisement 53*c*, a touch switch 51 corresponding to the position of button 53*e* is turned on. In response to the on signal of touch switch 51, CPU 65 executes retrieval and computation of a path (route) from the current position to the advertised location (guide position), based on guide position data correlated with the designated location in storage in RAM 68. After retrieval/determination of a guide path, CPU 65 turns off the advertisement 53*c* by operation of image processor 70 and displays map 53*b* on screen 53*a* and displays, as shown in FIG. 6, indication of a guide path 53*f* to the advertised location (guide position) on map 53*b*.

Therefore, the driver can proceed to the advertised location without deviation merely by following the indicated guide path 53*f*. On reaching the advertised location, the CPU 65 has completed such guidance to the guide position and has finished the advertisement delivery program. CPU 65 then awaits the new current position information API and travel direction information.

Advertisement delivery charges are billed/paid according to an advertisement information charge program of network navigation center 10. When the preset payment settlement date arrives, management server 28 of network navigation center 10 prepares details of the advertisement information ADI delivered from the day following the last payment settlement date to the current payment settlement date and of the advertisement delivery charges respectively for each ad sponsor based on data for the number of times of delivery and data for advertisement delivery charges of charge server 26, utilizing the advertisement charge program. Management server 28 then executes the operation of withdrawing advertisement delivery charges from the bank accounts of the respective ad sponsors on the basis of their bank account numbers stored in authentication server 27. Additionally, management server 28 prints advertisement delivery charges as statements with details of the advertisement information ADI delivered, along with withdrawal. Then, the printed statements are mailed to the respective ad sponsors.

Summarizing, the above-described embodiment provides the following, advantageous features:

(1) According to the present embodiment, since network navigation center 10 delivers advertisement information ADI to vehicle navigation device 41 based on the current position of vehicle navigation device 41 and the vehicle navigation device 41 presents the advertisement by display 53 and by speaker 54, the ad sponsor can deliver an advertisement to the driver (user) of automobile 11 carrying vehicle navigation device 41 without erection of a stationary sign or billboard.

(2) According to the present embodiment, when a designated location for presenting an advertisement lies within a certain distance from the current position of automobile 11, in other words when the current position of automobile 11 comes near the designated location, the advertisement information/message is delivered by network navigation center 10. Therefore, transmission of data with continuous connection to and from network navigation center 10 is not required and the load on each vehicle navigation device 41 and network navigation center 10 is reduced.

(3) According to the present embodiment, since advertisement information ADI is delivered to users registered beforehand, the load on the network navigation center 10 is further reduced.

(4) According to the present embodiment, on passing a designated location, advertisement 53c is displayed on display unit 53 and an advertisement message is announced from speaker 54. As a result, an ad sponsor can deliver an advertisement to a driver without a roadside sign or billboard. Additionally, the driver can obtain desired information by display of an advertisement on screen 53a and by voice during driving and thus avoid the inconvenience of searching by driving, especially when on a strange road.

(5) According to the present embodiment, since the display of an advertisement at a designated location is permitted only when the travel direction of automobile 11 is oriented toward the advertised location, the ad sponsor need not uselessly advertise and the driver is not bothered by watching or hearing an advertisement presented for a location already passed.

(6) According to the present embodiment, since by touching the button 53e denoted "GO", displayed on screen 53a along with advertisement 53c, is a guide path from the current position to the advertised location, displayed on map 53b on screen 53a, and the driver can arrive at the advertised location without deviation from the prescribed path.

(7) According to the present embodiment, each ad sponsor operates a personal computer 18 over Internet 17 to input designated location, travel direction, advertisement image, advertisement audio, guide position, presentation calender period, and presentation time(s) of day, which items of information are set for information server 25 over management server 28. Therefore, merely by operation of personal computer 18, each ad sponsor can easily set the designated location. Moreover, the designated location, travel direction, advertisement image, advertisement audio, guide position, presentation calender period and presentation times(s) of day, all stored in information server 25, can easily be changed.

(8) According to the present embodiment, since number of times of delivery is stored in charge server 26 each time when advertisement information ADI is delivered, operating conditions of each advertisement can be obtained and utilized for calculation of advertisement delivery charges to the ad sponsor.

(9) According to the present embodiment, since delivery conditions for advertisement are set by storing presentation calender period and presentation time(s) of day for the advertisement information to be delivered at a designated location, the ad sponsor can avoid useless advertisement and more efficiently advertise. Furthermore, since delivery conditions, such as age, gender, automobile manufacturer, vehicle type and vehicle name are stored in memory, advertisement can be more effectively directed to specific user(s).

(10) According to the present embodiment, by storing price for each designated location, price for each calender time period and price for each presentation time(s) of day beforehand in charge server 26, the sponsor of the ad can determine advertisement delivery charges beforehand and these prestored prices can also be utilized for calculation of advertisement delivery charges to the ad sponsors.

(11) According to the present embodiment, since management server 28 prepares details of advertisement information ADI delivered, based on data for number of times of delivery and data for advertisement delivery charges of charge server 26, when the preset payment settlement date arrives, a bill can be prepared simply and immediately on that settlement date. In addition, since advertisement delivery charges are withdrawn from the ad sponsors' bank accounts, based on the account numbers of the ad sponsors stored in authentication server 27, payment is immediately received.

In the aforementioned embodiment, advertisement is output from both display unit 53 and speaker 54, but in an alternative embodiment advertisement may be output from either display unit 53 or from speaker 54 alone.

Figure 7:
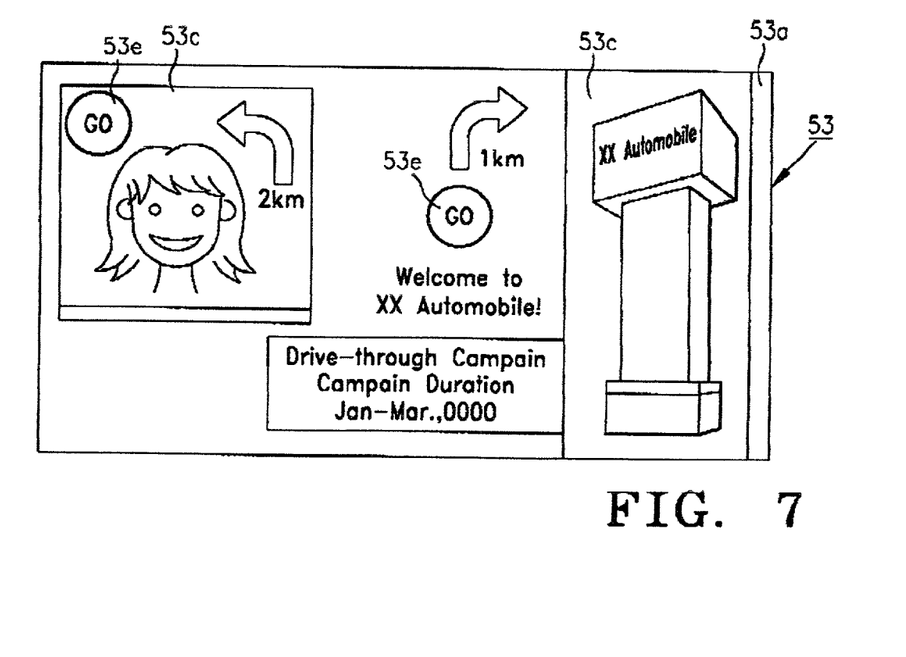
FIG. 7 illustrates display of a plurality of different advertisements on the screen of the display unit.

While in the above-described embodiment, one advertisement was described as being delivered at a designated location, of course it is also possible that several different advertisements can be presented at one designated location for presenting the advertisement. In this case, as shown in FIG. 7, screen 53a of display unit 53 is divided into plurality of sections and each section displays one advertisement 53c.

In the above-described embodiment, vehicle navigation device 41 executed the advertisement presenting program while simultaneously executing essential functions such as current position detection, map display, path retrieval, path guidance display. However, with the case vehicle navigation device 41 at rest, in another embodiment, an advertisement may be announced by display 53 and by speaker 54 on arriving at the designated location. In this latter case it is necessary for the vehicle navigation device 41 to be additionally provided with a program for detecting current position and traveling direction and for transmitting current position information API and travel direction information to network navigation center 10 for execution there of the advertisement delivery program. In addition, in this case advertisement is displayed on the entire screen of display 53.

Further, in the above-described embodiment, when the user operates 53e denoted "GO" and displayed on screen 53a along with advertisement 53c, a guide path from the current position to the advertised location is displayed on map 53b of screen 53a, but a product discount coupon or point sheet may also be printed out by printer 55 provided in vehicle navigation device 41 along with display. In this case, it is necessary to store, for example, in designated location information server 25, ticket issuing data for determining whether or not discount coupons and/or point sheets are to be printed and design data for printer 55 to use in printing discount coupons and point sheets.

Also, after having operated button 53e designated "GO", upon coming near to the designated location (e.g., a location 100 m in advance of an intersection, set by an ad sponsor), a discount coupon may be automatically issued to vehicle navigation device 41.

While in the aforementioned embodiment, operation of button 53e resulted in display of a guide path from the current position to the advertised location on map 53b of screen 53a, in other embodiments more detailed information of advertisement may be presented upon operating button 53e. For example, if the advertised location is a restaurant, menu, price, business hours are displayed and if an automobile store, name of the vehicle for sale, price, and date of delivery may be displayed. In this case, data for the more detailed advertisement information must be registered by the ad sponsor and stored, for example, in designated location information server 25. In this case there may be a charge against the user who requests and receives more detailed information. More specifically, use charges may be calculated by management server 28 according to the amount of communication data or number of times of use of detailed information delivered to a user and these use charges may be stored in charge server 26. Also, a bank account number may be associated with user authentication data consisting of ID code and password stored and managed in authentication server 27 and the user may be asked to register his/her bank account number. Network navigation center 10 can collect charges related to such deliveries over a given time period by withdrawing delivery charges from the bank account of the user at each settlement date fixed beforehand.

In the above-described embodiment, the user's name is stored in charge server 26 each time the user is delivered an advertisement, but, alternatively, the number of times of advertisement delivery to each user may be stored in charge server 26, whereby history of use by each user can be obtained.

In the above-described embodiment, management server 28 judges whether or not the user is registered by reference to the telephone number of mobile telephone 62, but such a determination may alternatively be based on the user's ID code and/or password. In this latter case, vehicle navigation device 41 is required to transmit the ID code and/or password from mobile telephone 62 along with current position information API and travel direction information.

Delivery condition data registered and managed in designated location information server 25 in the above-described embodiment may be altered to day data. Day data is data relating to the day (s) of the week for delivering the advertisement, such as for example Saturday or Sunday. In this case also, delivery charges may be suitably set according to the day(s) of the week for delivery.

In the above-described embodiment, delivery conditions for the advertisement, except for whether or not the user is registered, are determined as input by the ad sponsor, but in an alternative embodiment, at the network navigation center 10 side, delivery may be limited, even if the ad sponsor delivery conditions are met, according to user data, for example, age group and/or gender(s) or according to advertisement content. In addition, in the case of such further limiting of delivery, it is preferable to indicate the same beforehand when the ad sponsor is in the process of setting delivery condition(s).

Also, choice of business type of advertisement may be input at the user side. In this case, different types of businesses may be displayed on display unit 53 of vehicle navigation device 41 and, by the operation of touch switch 51 or key switch 52, business type, for example food and beverage business, may be selected. In this case vehicle navigation device 41 is required to transmit business type data for the food and beverage business to network navigation center 10 along with the current position information API.

In the above-described embodiment, number of deliveries and advertisement delivery charges are settled and stored when advertisement information ADI is delivered by network navigation center 10 but, alternatively, number of deliveries and advertisement delivery charges may be calculated and stored when advertisement is output on display 53 and by speaker 54.

In the above-described embodiment, advertisement information is delivered from network navigation center 10 beforehand when current position of automobile 11 nears a designated location but in another embodiment network navigation center 10 may deliver retrieved advertisement information immediately after the designated location agrees with the current position. In this case, since CPU 65 of vehicle navigation device 41 need only immediately output advertisement on display unit 53 and by speaker 54, the load on CPU 65 is reduced. Therefore, in this case, advertisement information ADI delivered by network navigation center 10 as advertisement information is advertisement data (advertisement image data, advertisement voice data) and guide position data. Also, advertisement information relating to all designated locations included within a given region centered around the current position of automobile 11, e.g., the region within 5 km around, may be delivered in advance.

The connection between the vehicle navigation device 41 and the network navigation center 10 may be continuous in another embodiment. In the above-described embodiment, advertisement information ADI could be delivered only to the user registered beforehand in the network navigation center 10 but, alternatively, advertisement information ADI may be delivered to persons not registered in network navigation center 10. In this case, advertisements can be delivered to many more potential customers.

In the above-described embodiment, information storage apparatus 44 provided in vehicle navigation device 41 may be any suitable for storing various programs and data, e.g., CD, MO, or DVD.

In the above-described embodiment, the advertisement delivery program is stored in information storage apparatus 44 but, alternatively, it may be stored in RAM 68 of main controller 45. Further, in the above-described embodiment, a guide path to the advertised location is displayed after the advertisement display but, for example, map scale may be contracted/controlled to display the advertised location and current position on the same map, so that the positional relationship between the two points can be understood at a glance.

In the above-described embodiment, after advertisement display the routine for display of a guide path from the current position to the advertised location is executed at the vehicle navigation device 41 side but, alternatively, the path search program may be executed in the management server 28 of network navigation center 10 and the path information may be transmitted to vehicle navigation device 41.

In the above-described embodiment, a guide path to the advertised location is displayed according to guide position data expressed by latitude and longitude but, alternatively, image data, e.g., a simplified map showing the advertised location and route thereto from the current position, may be used instead of guide position data expressed by latitude and longitude. In this case, the ad sponsor must register image data as guide position data beforehand in designated location information server 25.

In the above-described embodiment, a guide path to the advertised location could be displayed after the advertisement display but, alternatively, representation of the guide path may be omitted. Also, in the above-described embodiment, the total advertisement delivery charges were described as an advertisement delivery value multiplied by number of deliveries but, in another embodiment, the advertisement delivery price may be the total advertisement delivery charges.

In the above-described embodiment, the advertisement delivery charges were calculated based on advertisement delivery charge and number of deliveries but, alternatively, the delivery charges may be determined as a function of the amount of communication data delivered. While in the previously described embodiments, vehicle navigation device 41 transmits current position information API and travel direction information, in other embodiments merely current position information API is transmitted, without data related to travel direction.

While the vehicle navigation device 41 has been described as including mobile communication instrument 12 and mobile telephone 62, in the alternative, the vehicle navigation device 41 may be equipped with a receiver/transmitter (wireless installation) capable of transmitting current position information API and travel direction information and capable of receiving advertisement information ADI, instead of mobile telephone 62.

Further, while the mobile communication instrument 12 has been described as incorporated into vehicle navigation device 41, in the alternative, it may be embodied in a mobile telephone which includes a current position detecting means such as a GPS apparatus and/or PDA (Personal Digital Assistant). In this case, an advertisement can be delivered to a pedestrian carrying the mobile telephone. In this alternative embodiment, the system may output advertisement information only on screen and by speaker, without map display on the screen as in the previously described vehicle navigation device 41. The navigational program, etc., which are essential to the functioning of the vehicle navigation device 41, become needless in a mobile telephone.

In the case of a mobile telephone equipped with current position detecting means such as GPS apparatus and/or PDA, electric discount coupon data or electric point data may be transmitted from network navigation center 10 without printing the aforementioned discount coupon. In shopping the electric discount coupon or electric point may be displayed on the display of the mobile telephone or PDA by key operation based on the aforementioned data, and by submitting this discount information or point information to a store clerk, a discount or a privileged product or service may be given.

The advertisement 53c displayed on display 53 of vehicle navigation device 41 or mobile telephone equipped with current position detecting means or PDA display may be a moving image. In this case, advertisement image data becomes moving image data and the ad sponsor is required to register advertisement moving image data in designated location information server 25 beforehand. Since the advertisement is a moving image, delivery charges may have a different price schedule than that for a static image. In the above-described embodiment, delivery charges are withdrawn automatically from the bank account of each ad sponsor, but in another embodiment they may be withdrawn from another financial institution or may be transferred from a financial institution by mailing a bill to the ad sponsor.

In the previously described embodiments, processing of advertisement delivery charges occurs after a fixed time period, but payment of advertisement delivery charges may be done at anytime on each delivery.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The teachings of Japanese Application No. 2000-151600, filed May 23, 2000 are incorporated by reference herein in their entirety, inclusive of the specification, claims and drawings.

FIG. 1
10 network navigation center
18 personal computer
17 internet
FIG. 2
22 data converter
FIG. 3
44 information storage apparatus
51 touch switch
52 key switch
53 display unit
55 printer
56 GPS receiver
57 absolute orientation sensor
58 relative orientation sensor
59 distance sensor
60 VICS receiver
61 ATIS receiver/transmitter
62 mobile telephone
66 flash memory
69 image memory
70 image processor
71 voice processor
72 communication interface
73 sensor input interface
74 clock
FIG. 4
郵便局post office
幼稚園kindergarten
高校ΔΔ senior high school
文school
○Δ一丁目 first block of ○Δ

FIG. 5

いらっしゃいませ Welcome!

FIG. 6

郵便局 post office

幼稚園 kindergarten

高校ΔΔ senior high school

文 school oΔ一丁目 first block of oΔ

FIG. 7 xx自動車 xx Automobile xx自動車へようこそ! Welcome to xx Automobile!

ドライブスルーキャンペーン Drive-through campaign

キャンペーン期間 campain duration oooo年1–3 月 Jan.-Mar., oooo

FIG. 8

郵便局 post office

幼稚園 kindergarten

ΔΔ高校 ΔΔ senior high school

文 school oΔ一丁目 first block of oΔ

FIG. 9

郵便局 post office

幼稚園 kindergarten

ΔΔ高校 ΔΔ senior high school

文 school oΔ一丁目 first block of oΔ

FIG. 10

郵便局 post office

幼稚園 kindergarten

ΔΔ高校 ΔΔ senior high school

文 school oΔ一丁目 first block of oΔ

We claim:

1. A method of delivering advertisement information to a mobile communication instrument comprising:

designating, by a sponsor of the advertisement information, a location at which the advertising information is to be delivered to the mobile communication instrument;

storing in memory the advertisement information to be presented at the designated location;

transmitting information for the current position of the mobile communication instrument from the mobile communication instrument to an advertisement information delivery apparatus remote from the mobile communication instrument and including the memory;

retrieving advertisement information relating to the current position from the memory based on the current position information received from the mobile communication instrument;

delivering the retrieved advertisement information to the mobile communication instrument;

calculating advertisement delivery charges for the delivery based on advertisement information content, designated location for presentation of the advertisement information and advertisement information presentation time period; and charging, or liquidating by payment, the calculated advertisement delivery charges to the sponsor.

* * * * *